United States Patent [19]

Veronesi et al.

[11] Patent Number: 4,708,842
[45] Date of Patent: Nov. 24, 1987

[54] FLUID MODERATOR CONTROL SYSTEM FUEL ASSEMBLY SEAL CONNECTOR

[75] Inventors: Luciano Veronesi, O'Hara Township, Allegheny County; Stephen N. Tower, Washington Township, Westmoreland County; William E. Klassen, Monroeville, all of Pa.

[73] Assignee: Westinghouse Electric Corp., Pittsburgh, Pa.

[21] Appl. No.: 815,779

[22] Filed: Jan. 2, 1986

Related U.S. Application Data

[63] Continuation of Ser. No. 626,942, Jul. 2, 1984, abandoned.

[51] Int. Cl.$^4$ ............................................. G21C 13/00
[52] U.S. Cl. ...................................... 376/203; 376/209
[58] Field of Search ..................... 376/203, 204, 209; 277/58, 212 FB

[56] References Cited

U.S. PATENT DOCUMENTS

| | | | |
|---|---|---|---|
| 2,097,585 | 11/1937 | Carson | 220/374 |
| 3,010,887 | 11/1961 | Baumgarten et al. | 376/203 |
| 3,081,246 | 3/1963 | Edlund | |
| 3,103,475 | 9/1963 | Szilard | 376/209 |
| 3,212,984 | 10/1965 | Tollet et al. | 376/209 |
| 3,247,068 | 4/1966 | Schluderberg et al. | |
| 3,247,074 | 4/1966 | Schluderberg et al. | |
| 3,255,087 | 6/1966 | Maldague | |
| 3,261,755 | 7/1966 | Mostert | |
| 3,275,521 | 9/1966 | Schluderberg et al. | |
| 4,062,726 | 12/1977 | Walling | 376/204 |

FOREIGN PATENT DOCUMENTS

| | | | |
|---|---|---|---|
| 2928778 | 4/1981 | Fed. Rep. of Germany | 277/212 FB |
| 1343577 | 4/1968 | France | 376/203 |

Primary Examiner—Deborah L. Kyle
Assistant Examiner—Richard L. Klein
Attorney, Agent, or Firm—Daniel C. Abeles

[57] ABSTRACT

Apparatus comprising a seal connector is disclosed for sealingly connecting flow channels in the core support plate with flow channels in fuel assemblies for use in a spectral shift pressurized water nuclear reactor. Spectral shift is obtained by displacing a portion of the light water in the core with deuterium oxide or a combination of deuterium oxide and light water or various gases such as helium during the initial state of reactor operation to harden the nuclear spectrum and thereby reduce excess reactivity and increase the production of fissile materials. The seal connectors provide a sealed flow channel for introducing the deuterium oxide into the core during the early stages of reactor operation and for reintroducing the light water into the core during the later stages of reactor operation.

19 Claims, 3 Drawing Figures

FLUID MODERATOR CONTROL SYSTEM FUEL ASSEMBLY SEAL CONNECTOR

This application is a continuation of application Ser. No. 626,942 filed July 2, 1984, now abandoned.

CROSS-REFERENCES TO RELATED APPLICATIONS

This application is related to copending application Ser. No. 626,847, entitled FUEL ASSEMBLY filed Feb. 7, 1984, (W.E. 49,102) by R. K. Gjertsen, et al. which is assigned to Westinghouse Electric Corporation.

BACKGROUND OF THE INVENTION

1. Field of the Invention

This invention relates in general to the field of spectral shift pressurized water nuclear reactors and in particular to apparatus for seal connecting between fuel assemblies and the means used to provide the spectral shift control.

2. Description of the Prior Art

In conventional, state of the art, pressurized light water nuclear reactors, the reactor core is designed to contain excess reactivity. As the reactor operates, the excess reactivity is very gradually consumed until such point as the reactor core will no longer sustain the nuclear reaction and then the reactor must be refueled. Usually this occurs over a period of years. It is very advantageous to maximize the time between reactor refuelings (extend the life of the core) since refueling requires complete shutdown of the reactor and is quite time consuming. Extending the life of the core is usually accomplished by providing the core with a significant amount of excess reactivity.

Typically, control over the fission process, or reactivity control, including control necessitated by the excess reactivity is accomplished by varying the amount of neutron-absorbing materials within the core of the reactor. Control rods which contain neutron-absorbing materials and are movable into and out of the core provided one method of controlling the reactivity. Burnable and nonburnable poisons dissolved inthe reactor coolant provide another method of reactivity control. As the reactivity decreases, due to reactor operation, the poisons are gradually removed by being burned by reactor operation or are physically removed by a separate system designed for such purpose. Most often, a combination of dissolved poisons and control rods are used to control the reactor and the excess reactivity.

Unfortunately, control with control rods and poisons, absorb neutrons which could otherwise be used in a productive manner. For example, the neutrons produced by the excess reactivity could be used to convert fertile materials within the fuel assemblies to plutonium or fissile uranium which can then be fissioned and contribute to an even further extension of core life. Thus, while the use of control rods and dissolved poisons provide very effective reactor control, their use comprises a relatively inefficient depletion of high cost uranium. It would be, therefore, advantageous to control the excess reactivity, but not suppress the neutrons associated with the excess reactivity, in order to further extend core life or time between refuelings, and to lower fuel costs.

It is known that fuel element enrichment can be reduced and the conversion ratio of producing fissile materials can be increased by employing a "hardened" (nuclear energy) spectrum during the first part of the fuel cycle to reduce excessive reactivity and to increase the conversion of fertile material to fissile material; then employing a "softer" (lower energy) neutron spectrum during the latter part of the fuel cycle to increase reactivity and extend the core life by fissioning the previously generated fissile material. One such method utilizing the above is known as spectral shift control which provides a reactor with an extended core life while reducing the amount of neutron absorbing material inthe reactor core. One example of such method of control comprises a mechanical spectral shift reactor whereby hollow displacer rods are provided within fuel assemblies within the core (which, of course, displace) an equal volume of water within the fuel assemblies) and which are mechanically withdrawn or punctured to accomplish water flooding of the available volume. In the early stages of core life, the neutron spectrum is hardened by the dissplacement of a portion of the water within the core by the displacer rods. The spectrum is later softened by the addition of water within the core by the aforesaid rod withdrawal or puncturing U.S. Pat. No. 4,432,930, entitled "Spectral Shift Reactor Control Method" by A. J. Impink, Jr., et al., issued Feb. 21, 1984, assigned to Westinghouse Electric Corporation, discloses one such mechanical spectral shift reactor.

Another method of achieving a spectral shift is to utilize heavy water or deuterium oxide to replace an equivalent volume of core water during the early stages of core life then to gradually reduce the volume of heavy water and replace it with regular reactor coolant (light water) during the later stages of core life. The less effective moderator, heavy water, allows for less fuel enrichment and a higher ratio of converting fertile material to fissile material which in combination provides for a reduction of fuel costs and an extension of core life. An example of this art is found in patent application Ser. No. 626,847, entiteld "Fuel Assembly" by R. K. Gjertsen, et al., filed on Feb. 7, 1984, and assigned to Westinghouse Electric Corporation. In the "Fuel Assembly" patent application, there is explained the need for a seal connector between the fuel element assembly and the lower core support plate which allows for the introduction of the heavy water replacing the light water moderator and the subsequent reintroduction of the moderator while effectuating a sealed connection between the fuel assemblies and the core support plate. The use of such seal connectors is new to pressurized water reactors. Such seal connectors must provide for sealing to guard against sudden increases in reactivity and for a nonfixed or nonpermanent sealed connection because of the inaccessibility of the bottom of the fuel assembly during core fueling.

Accordingly, it is a primary object of the present invention to provide a seal connector which minimizes the possibility of leakage into the connector so as to prevent an inadvertent increase in reactivity.

Another object of the present invention is to provide a seal connector which is integral with the fuel assembly and allows for automatic connection upon positioning of the fuel assembly within the reactor core.

Still another object of the present invention is to provide a seal connector which allows for repair or replacement so as to avoid premature scrapping of an entire fuel assembly due to a damaged seal connector.

SUMMARY OF THE INVENTION

The present invention comprises apparatus for sealingly connecting moderator fluid flow channels in the core support plate with moderator fluid flow channels in fuel assemblies for flowing a desired amount of a combination of deuterium oxide and light water through a portion of the nuclear core to achieve spectral shift.

The connector comprises a first portion mechanically fixed and sealed to the fuel assembly and a second portion which is slip fitted to the core support plate. A bellows mechanically fixed to each of the first and second portions allows for relative motion and seals between the two portions. The second motion includes a primary seal comprising a ball and cone seal and a backup seal comprising a plurality of piston ring seals. The primary seal is loaded by the fuel assembly weight and spring load.

A second embodiment is provided whereby one or more piston ring seals are utilized between the first and second portions to provide a backup seal in the event of a failure of the bellows.

Various other objects, advantages and features of the invention will become apparent to those skilled in the art from the following discussion taken in conjunction with the following drawings, in which:

DESCRIPTION OF THE PREFERRED EMBODIMENT

Figure 1:
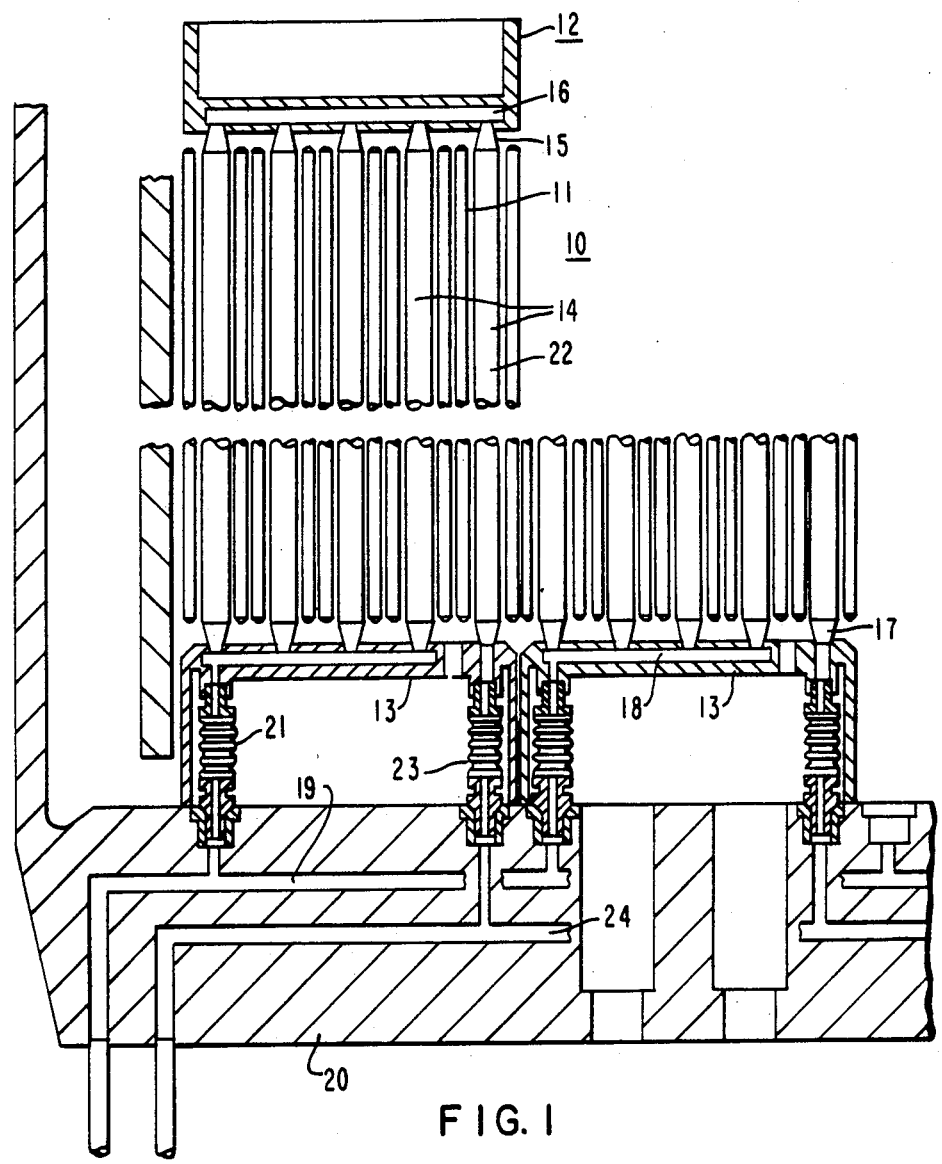
FIG. 1 is a cross-sectional view of a portion of a core of a pressurized water nuclear reactor employing a fluid moderator control system illustrating a general use of a seal connector.

Referring now to FIG. 1 of the drawings, there is depicted threin a portion of the core and the reactor lower internals. A fuel assembly generally designated by the numeral 10 includes a plurality of fuel rods 11, an upper outlet flow nozzle 12, and a lower inlet flow nozzle 13. Fuel rods 11 are parallel arranged and may be held in spaced relationship to each other by Inconel grids (not shown) as is well known in the art. A plurality of moderator control tubes 14 are interspersed among fuel rods 11. The Inconel grids (not shown) also support and are attached to the moderator control tubes 14. Upper outlet flow nozzle 12 is fixedly attached to the upper end 15 of the moderator control tubes 14 as by welding. A manifold 16, within upper outlet nozzle 12, flow connects the upper ends 15 of moderator control tubes 14. Similarly, the lower inlet flow nozzle 13 is seal welded to the lower end 17 of the moderator flow tubes 14. A lower manifold 18 flow connects the lower end 17 of all but one of the moderator flow tubes 14.

Fuel assembly 10, as described, is of a type used with a light water, pressurized nuclear reactor which utilizes the spectral shift concept by varying the amount of deuterium oxide or heavy water within the fuel assembly, thereby varying the amount of light water moderator within the core. The deuterium oxide enters the fuel assembly via the channels 19 in the lower core support plate 20, through inlet seal connector 21, to lower nozzle manifold 18. The deuterium oxide is then distributed to the moderator control tubes 14 which, upon rising to the upper nozzle manifold 16, displaces the light water therein. The deuterium oxide then flows down the return flow moderator tube 22 to outlet seal connector 23 to the outlet channel 24 in the lower core support plate 20.

A more complete description of fuel assembly 10, lower core support plate 20 and the flow path of the deuterium oxide may be found in copending U.S. patent application Ser. No. 626,847, filed Feb. 7, 1984, by R. K. Gjertsen, et al., entitled "Fuel Assembly" and assigned to Westinghouse Electric Corporation. It is to be noted, however, that once the desired amount of deuterium oxide is achieved within the moderator control tubes 14 and 22, the flow of deuterium oxide is reduced to the extent necessary to provide for any makeup heavy water required as a result of internal leakage and more importantly to provide a controlled continuous flow to remove radiation energy and to maintain the temperature of the heavy water below the boiling point. Hence, each seal connector 21 and 23 experiences the substantially same internal pressure. Moreover, since each seal connector 21 and 23 are located at the same axial core station, they each experience the same external pressure. Therefore, the inlet seal connector 21 is exposed to virtually the same environment as the outlet seal connector 23, and, by adjusting the internal pressure of the deuterium oxide to that of the coolant moderator at the inlet to the fuel assembly 10, there is substantially no pressure differential between the internal portion and the external portion of the seal connectors 21 and 23. Because of the substantially similar operating environment of the seal connectors 21 and 23, each seal connector may be made precisely the same and can be interchangeable.

Figure 2:
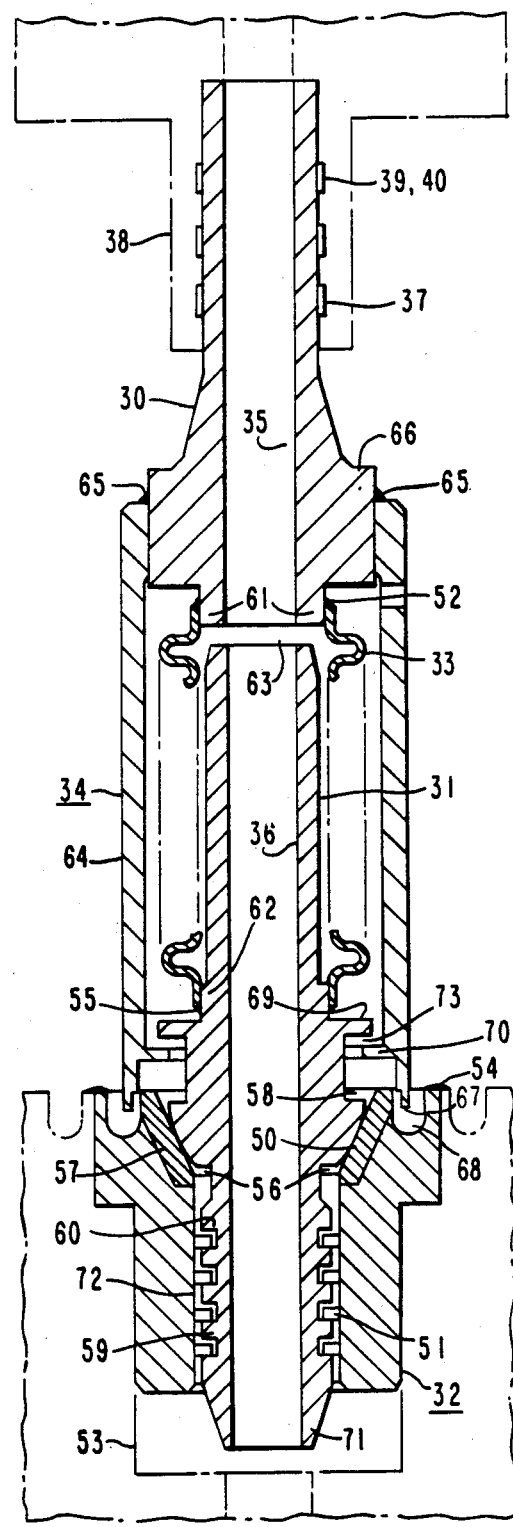
FIG. 2 is a detail view in cross section of one embodiment of a seal connector made in accordance with the invention herein; and, FIG. 3 is a detail view in cross section of another embodiment of a seal connector made in accordance with the invention herein.

Details of seal connector 21 or 23 are shown in FIG. 2. Notwithstanding the near zero pressure differential internal and external of the seal connector, they are made to be leak free in the unlikely event of the existence of a negative or a positive pressure differential. A positive pressure differential coupled with a leaking seal connector could result in an inadvertent increase in moderation by an unplanned reintroduction of moderator within the fuel assembly 10. Obviously, such a condition is undesirable. On the other hand, a negative pressure differential coupled with a leaking seal connector could result in an unplanned decrease in moderator which is also undesirable.

Seal connector 21 or 23 in general comprises a static upper portion 30 which is connected to the inlet end of fuel assembly 10, a movable lower portion 31 which is inserted within an insert 32, the lower core support plate 20, a bellows 33 connecting the upper 30 and lower 31 portions and a skirt 34 connected to upper portion 30 and which encircles bellows 33. Flow channels 35 and 36 are provided within upper portion 30 and lower portion 31, respectively, for purposes of introducing deuterium oxide or any other fluid (liquid or gas) which is less effective in slowing down neutrons than light water into the fuel assembly 10 or reintroducing the light water reactor coolant into said fuel assembly 10.

Since the bottom or the moderator inlet end of fuel assembly 10 is inaccessible during the initial placement of fuel assemblies within the core, during fuel shuffling operations or during core refueling, a fixed or permanent mechanical connection between fuel assembly 10 and the lower core support plate 20 is not practical. Hence, seal connector 21 or 23 may be integral with or permanently affixed only at one end ot either the lower nozzle 13 or the core support plate 20. In the embodiment illustrated in FIG. 2, the static upper portion 30 of seal connector 21 or 23 is integral with flow nozzle 13 while the movable lower portion 31 comprises a slip fit which is spring loaded within and against core support plate 20 by a combination of fuel assembly hold down spring forces, the weight of the fuel assembly and a bellows spring force to be described hereinafter. The sealed fit between lower portion 31 and core support plate 20 is effectuated upon placement of fuel assembly 10 within the reactor core and is disconnected upon removal of fuel assembly 10. It is to be noted that an integral connection at the lower core support plate 20 with a slip fit at the flow nozzle 13 would be equally satisfactory and such alternative is intended to be included within the scope of the invention described herein.

Still referring to FIG. 2, upper static portion 30 may be connected by a rolled bulge joint 37 within a boss or cylindrical extension 38 which is an integral part of lower nozzle 13. A plurality of rolled bulge joints 37 are provided so that a substantially leak free joint obtains between upper portion 30 and boss 38. In this type of joint, the thin cylindrical portion 39 of static portion 30 is rolled into grooves 40 in the internal surface of boss 38. Another equally satifactory and adequate mechanical connection may comprise a "Swage-lok" or other similar type of tube to housing connection. Still another type of seal joint may comprise threading upper portion 30 into boss 38 and seal welding around the periphery thereof provided the materials used are capable of being welded.

One method to effectuate the seal between the movable portion 31 of seal connector 21 or 23 and the lower core support plate 20 comprises a ball and cone seal 50 in combination with a plurality of "piston ring" seals 51. In this regard, insert 32 is inserted within an opening 53 in core support plate 20 and is welded 54 thereto. Weld 54 serves as a mechanical and a sealing joint, with the latter being necessitated because of the need for opening 53 to be flow connected to either flow channel 19 or 24 in core support plate 20, which in turn provides flow communication between the flow channels 35 and 36 in seal connector 21 or 23.

Ball and cone seal 50 employs principles which are well known in the art. A truncated conical surface 56 is provided at the upper end of insert 32. Surface 56 may be directly machined in insert 32 or may comprise a conical insert 57 made of a material substantially harder than the material from which lower portion 31 of seal connector 21 or 23 is made which is welded to lower portions 31 and then machined to final dimensions. While being slightly more complicated, the conical insert 57 is preferable in that it negates the probability of damage to the insert 32 integral with the lower core support plate 20.

Movable portion 31 of the seal connector 21 or 23 includes a machined truncated spherical surface 58 which sealingly mates with conical surface 56. A plunger 59 extends from movable portion 31 and has a plurality of piston ring seals 51 fitted to grooves 60 machined in the periphery thereof. Ring seals 51 are of any design which is well known in the art and serve as a backup seal to limit any leakage into or out from the moderator control tubes 14 in the event that the main ball and cone seal 50 is damaged or otherwise fails to operate properly.

A bellows 33 sealingly connects lower portion 31 to upper portion 30 of seal connector 21 or 23. Bellows 33 is made of metal and is welded at 52 and 55 to a cylindrical extension 61 from upper portion 30 and a cylindrical extension 62 from lower portion 31. Clearance space 63 is provided between upper 30 and lower 31 portions of the seal connector. Clearance space 63 allows for relative axial motion between the upper 30 and lower portions 31 which motion allows for a compressive load to be applied to fuel assembly 10 when installed in the reactor core and assures positive sealing of spherical surface 58 within conical surface 56. As illustrated, bellows 33 comprises a spring which transmits its compressive force, the compressive spring force applied to fuel assembly 10 and the weight of the fuel assembly to the lower portion 31 of seal connector 21 or 23. Metallic bellows 33 and clearance space 63 also allows for proper sealing notwithstanding any slight misalignment perpendicular to the axial centerline of the seal connector 21 or 23.

Skirt 34 provides protection for bellows 33 and serves as an additional stop to limit the compressive travel of the movable lower portion 31 relative to the upper portion 30. Skirt 34 comprises a cylindrical tube 64 welded at 65 to an enlarged cylindrical portion 66 of the static upper portion 30. Skirt 34 extends down from said weld 65 covering the bellows 33 and terminates at end 67 which is spaced from insert 32 by a predetermined amount 68. Corresponding overlapping flanges or tabs 69 and 70 on movable portion 31 and skirt 34, respectively, limit the extension of space 63 when seal connector 21 or 23 is not fitted between nozzle 13 and core support plate 20.

As described, seal connector 21 or 23 comprises a mechanically connected extension of a fuel assembly 10. Insert 32 is fixedly connected to core support plate 20. In the event seal connector 21 or 23 is damaged, it may be removed from fuel assembly 10 and replaced with a new seal connector. During such replacement, fuel assembly 10 is of course not assembled within a reactor core.

When assembling a fuel assembly 10 equipped with seal connectors 21 and 23, normal procedures and precautions are utilized. Guide pins (not shown) as are commonly known in the art are used to guide the installation of fuel assembly 10 in its attachment to the core support plate 20. In this manner, the fuel assembly is properly aligned prior to any fit up between the seal connectors 21 and 23 and insert 32 so as to assure that the seal connectors 21 and 23 are not damaged during the installation procedure. Plunger 59 is further provided with a tapered entrance end 71 in the unlikely event of any misalignment of the fuel assembly 10 relative to core support plate 20. Taper 71 even further provides for minor misalignment, if any, of plunger 59 relative to opening 72 within insert 52. The transverse motion permitted by bellows 33, as previously described, then assures full sealing along the length of plunger 59. Contact between spherical surface 58 and conical surface 56 is effectuated after plunger 59 is substantially fully fitted within opening 72.

Since bellows 33 exerts an extending force between upper 30 and lower 31 portions of the seal connectors 21 and 23, where contact is first made between the spherical 58 and conical 56 sealing surfaces, space 63 is greater than that shown in FIG. 2 by an amount approximately equal to the space 73 between flanges or tabs 69 and 70. The spring force on the exit end of fuel assembly 10 (not shown) as is commonly used in pressurized water nuclear reactors plus the weight of fuel assembly 10 serves to compress bellows 33 which then loads the spherical 58 and conical 56 surfaces. Upon completion of installation and the initiation of reactor operation, flow channels in the core support plate 20 are in flow communication with the aligned flow channels 35 and 36 in seal connectors 21 and 23 which permit flow into and out of the moderator control tubes 14 and 15.

Figure 3:
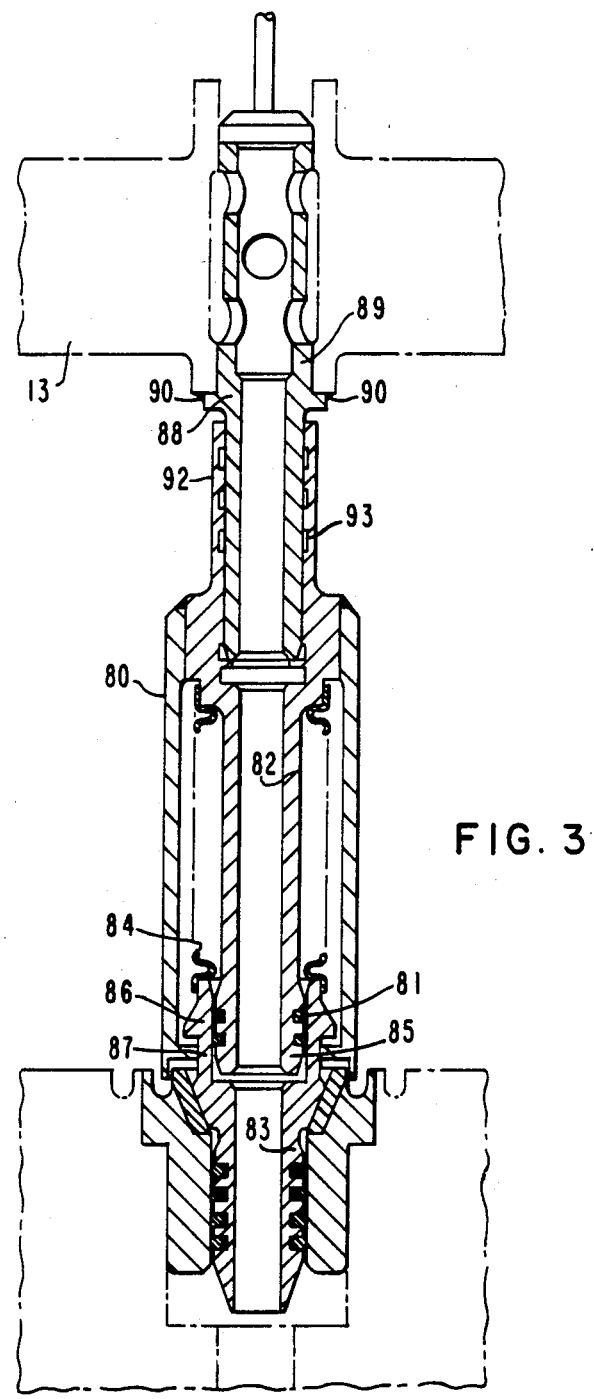

Another embodiment of a seal connector 80 is shown in FIG. 3. In general, this embodiment differs from that of FIG. 2 by the provision of one or more ring seals 81 between the static portion 82 and the movable portion 83 of the seal connector 80. Ring seals 81 provide a backup seal in the unlikely event of failure of bellows 84. Ring seals 81 are fitted to grooves within end 85 of static portion 82; end 85 fits within an extension 86 of movable portion 83 which has an opening 87 therein and overlaps end 85.

Further illustrated in FIG. 3 is an alternate method of attaching the static portion 82 to the lower nozzle 13. A flow connector 88 is inserted within an opening 89 in the lower nozzle 13. Opening 89 is in flow communication with either the lower nozzle manifold 18 and moderator control tube 22 (FIG. 1) depending upon whether seal connector 80 comprises an inlet connector or an outlet connector, rspectively. Flow connector 88 is welded 90 to lower nozzle 13. An extension 91 of the flow connector 88 fits within the upper end 92 of the static portion 83 of seal connector 80. As shown, static portion 83 is integrally seal connected to flow connector 88 by a plurality of rolled joints 93. As previously discussed, such connection may also comprise a "Swage-lok" type of connection.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim:

1. A nuclear reactor comprising fuel assemblies having one or more flow channels therethrough, a core support plate having one or more flow channels therethrough, and seal connectors for sealingly connecting said one or more flow channels in said core support plate with said one or more flow channels in said fuel assemblies, said seal connectors each comprising a first portion, a second portion, said first and second portions each comprising an elongated member having a flow channel therethrough and being in substantial axial alignment with each other and being separated by a space therebetween, means for sealingly connecting said first portion to one or said one or more flow channels in said fuel assemblies, means for sealingly connecting said second portion to said first portion and for allowing relative motion between said portions, means for limiting the relative motion of said first and second portions in directions toward and away from each other, means for reconnectingly connecting and resealingly sealing said second portion to one of said one or more flow channels in said core support plate, comprising a slip fit connection whereby the remote end of the second portion fits within an opening in the core support plate which is in flow communication with said one or more flow channels in said core support plate and further comprises a ball and cone seal in series with a plurality of axially spaced ring seals.

2. The reactor of claim 1, wherein said means for sealingly connecting said first portion to said one or more flow channels in said fuel assembly comprises a permanently affixed mechanical joint.

3. The reactor of claim 2, wherein said mechanical joint comprises a rolled joint connection between the remote end of said first portion concentrically positioned with an opening in said fuel assembly.

4. The reactor of claim 1, wherein said ball and cone connection comprises a truncated spherical surface on said second portion and a truncated conical surface on said core support plate.

5. The reactor of claim 4, including an insert fixedly connected to said core support plate, said insert having said truncated conical surface thereon.

6. The reactor of claim 5, wherein said truncated conical surface is located on a truncated conical member fixedly connected to said insert with said surface of said truncated conical member being harder relative to said truncated spherical surface.

7. The reactor of claim 1, wherein said means for sealingly connecting said first and second portions and for allowing relative axial motion therebetween comprises a bellows attached at one end to said first portion and at its other end to said second portion, said bellows comprising spring means for loading said ball and cone connection.

8. The reactor of claim 1, including means for covering said means for seal connecting said first and second portions and for allowing relative axial motion.

9. A nuclear reactor comprising fuel assemblies having one or more flow channels therethrough, a core support plate having one or more flow channels therethrough, and seal connectors for sealingly connecting said one or more flow channels in said core support plate with said one or more flow channels in said fuel assemblies, said seal connectors each comprising a first portion, a second portion, said first and second portions each comprising an elongated member having a flow channel therethrough and being in substantial axial alignment with each other, means for sealingly connecting said first portion to one of said one or more flow channels in said fuel assemblies, means for sealingly connecting said second portion to said first portion and for allowing relative motion between said portions, means for reconnectingly connecting and resealingly sealing said second portion to one of said one or more flow channels in said core support plate, comprising a slip fit connection whereby the remote end of the second portion fits within an opening in the core support plate which is in flow communication with said one or more flow channels in said core support plate and further comprises a ball and cone seal in series with a plurality of axially spaced ring seals, wherein the proximal ends of said first and second portions are telescopically connected with a seal therebetween.

10. The reactor of claim 9, wherein said means for sealingly connecting said first portion to said one or more flow channels in said fuel assembly comprises a permanently affixed mechanical joint.

11. The reactor of claim 10, wherein said mechanical joint comprises a rolled joint connection between the remote end of said first portion concentrically positioned with an opening in said fuel assembly.

12. The reactor of claim 9, wherein said ball and cone connection comprises a truncated spherical surface on said second portion and a truncated conical surface on said core support plate.

13. The reactor of claim 12, including an insert fixedly connected to said core support plate, said insert having said truncated conical surface thereon.

14. The reactor of claim 13, wherein said truncated conical surface is located on a truncated conical member fixedly connected to said insert with said surface of said truncated conical member being harder relative to said truncated spherical surface.

15. The reactor of claim 9, wherein said means for sealingly connecting said first and second portions and for allowing relative axial motion therebetween comprises a bellows attached at one end to said first portion and at its other end to said second portion, said bellows comprising spring means for loading said ball and cone connection.

16. The reactor of claim 9, including means for covering said means for seal connecting said first and second portions and for allowing relative axial motion.

17. The reactor of claim 9, including means for limiting the relative motion of said first and second portions in a direction toward each other.

18. The reactor of claim 9, including means for limiting the relative motion of said first and second portions in a direction away from each other.

19. The reactor of claim 9, wherein said seal between said proximal ends comprises a plurality of axially spaced ring seals.

* * * * *